United States Patent [19]
Klemann et al.

[11] 3,889,279
[45] June 10, 1975

[54] ELECTROMAGNETICALLY OPERATED PHOTOGRAPHIC SHUTTER IN MICROPHOTOGRAPHIC MECHANISMS

[75] Inventors: Heinrich Klemann, Burgsolms; Herbert Leiter, Wetzlar, both of Germany

[73] Assignee: Ernst Leitz GmbH

[22] Filed: Jan. 8, 1973

[21] Appl. No.: 321,950

Related U.S. Application Data

[63] Continuation of Ser. No. 172,003, Dec. 6, 1972, abandoned.

[30] Foreign Application Priority Data
Sept. 6, 1970 Germany.............................. 2044646

[52] U.S. Cl. ..................... 354/79; 350/19; 354/247; 354/264; 354/265
[51] Int. Cl............................ G02b 21/36; G03b 9/14
[58] Field of Search ............. 95/53 EA, 62; 350/19; 354/79, 50, 51, 264, 265, 247

[56] References Cited
UNITED STATES PATENTS

| | | | |
|---|---|---|---|
| 2,638,825 | 5/1953 | Fairbank................................ | 95/62 |
| 2,917,982 | 12/1959 | Martin ................................... | 95/62 |
| 3,020,816 | 2/1962 | Frenk.................................... | 95/53 X |
| 3,635,141 | 1/1972 | Starp et al. ............................ | 95/53 |

*Primary Examiner*—Samuel S. Matthews
*Assistant Examiner*—James LaBarre
*Attorney, Agent, or Firm*—Krafft & Wells

[57] ABSTRACT

Electromagnetically operable shutter for microphotographic devices, wherein the shutter has two angular slides movable substantially at right angles to the optical axis of the shutter and rotatably mounted approximately at the apex of the angles, the first angle blades of these slides covering, in the closed position, the light passage aperture while the second angle blades are opposed to the poles of two magnet cores and the second angle blades are disposed in one side of the optical axis of the light passage aperture with the magnet cores and the electromagnets.

5 Claims, 3 Drawing Figures

ELECTROMAGNETICALLY OPERATED PHOTOGRAPHIC SHUTTER IN MICROPHOTOGRAPHIC MECHANISMS

This is a continuation of Application Ser. No. 172,003, filed Dec. 6, 1972, now abandoned.

CROSS REFERENCE TO A RELATED APPLICATION

Applicants claim priority under 35 U.S.C. 119 for application Ser. No. P 20 44 646.2, filed Sept. 9, 1970 in the Patent Office of the Federal Republic of Germany.

BACKGROUND OF THE INVENTION

The field of the invention is compound lens systems with a photographic image recorder. The invention is particularly concerned with an improvement in the image recorder shutter which is operated by the change in direction of electromagnetic lines of force.

Photographic shutters which are operated electromagnetically are known per se in a great variety of designs. However, all of these conventional shutters have in common that they are relatively thick in the axial direction, due to the magnets surrounding the blades. Also, a special shutter is conventional wherein two blades flip apart in the manner of a louver-type shutter. This motion is, of course, also effected in the axial direction so that this shutter has a larger structural height in the axial direction due to the blades themselves when they are disposed in their open position.

However, for the shutters in microphotographic devices, it is an essential prerequisite that the structural height in the axial direction be as small as possible. These shutters are usually intended to be inserted between a microscope and an auxiliary camera, wherein still additional structural components must be accommodated in the light beam path. Such components are, for example, beam splitters conducting a portion of the light to an observation device, and in the case of an automatically controlled or regulated shutter, still another beam splitter which conducts another portion of the light to a photoelectric transducer. It is not practicable to structure such a microphotographic device, if the thickness of the shutter assumes larger dimensions.

Therefore, the problem exists of constructing an electromagnetically operable photographic shutter, the axial structural length of which is reduced to a minimum and which, quite generally, offers satisfactory conditions for the installation of additional optical and-/or mechanical components.

SUMMARY OF THE INVENTION

Having in mind the limitations of the prior art, it is an object of the present invention to provide a photographic shutter having a minimum axial thickness when combined with a compound lens system.

This object is achieved, according to the invention, by providing that the shutter consists of two slides movable substantially at right angles to the optical axis of the shutter and fashioned in the shape of angular blades, which slides are rotatably mounted approximately at the apex of the angular blades. One blade of each of these angle-shaped slides covers, in the closed position, the light passage aperture, whereas the other blade of each slide is opposite the poles of two magnet cores. Furthermore, the invention provides that the other blades with the magnet cores and the electromagnet are all disposed on one side of the optical axis of the light passage aperture.

The essential features of the invention are the movement of the slides in only one plane at right angles to the optical axis, as well as the arrangement of all driving structural elements, i.e., preferably the entire magnetic system, on one side of the light passage aperture. The first feature is of particular significance with respect to the structural height of the shutter. Due to the fact that substantially only the two slides, optionally with carrier plates, are superimposed, an extremely small structural height in the direction of the optical axis can be accomplished in the zone of the light passage aperture. In a prototype of the shutter, this structural height was merely 2 mm. Besides, the movement of the slides in one plane is advantageous in view of the short shutter times attainable, since the air resistance for the slides is reduced to a minimum.

The second feature is essential for the accessibility of the shutter from one side. The magnet with coil and magnet cores is arranged behind the light passage aperture, so that free access to the penetrating beam of rays is ensured from the opposite side. Therefore, prisms can be inserted in the light flux from this side, and these prisms deflect a portion of the rays to a view finder and-/or to a light meter.

The slides normally consist of a magnetic material. However, a preferred embodiment comprises each slide with two different blades wherein the blades opposite the magnet poles are of a magnetic material such as iron or steel, and the light-blocking blades are of a non-magnetic material such as nylon or teflon. This embodiment has the result that on the one hand, the light-blocking blades, which overlap with each other to a minor extent, do not stick together due to magnetic forces. However, on the other hand, the flux of the magnetic lines of force from pole to pole remains preserved and is not interrupted. The slides can, however, also consist entirely of a non-magnetic material and in this case the slide blades cooperating with the poles of the magnet armatures must be studded with or have a piece of a magnetic material embedded therein, e.g., soft iron pieces embedded in nylon or teflon.

DESCRIPTION OF THE PREFERRED EMBODIMENTS

Figure 1:
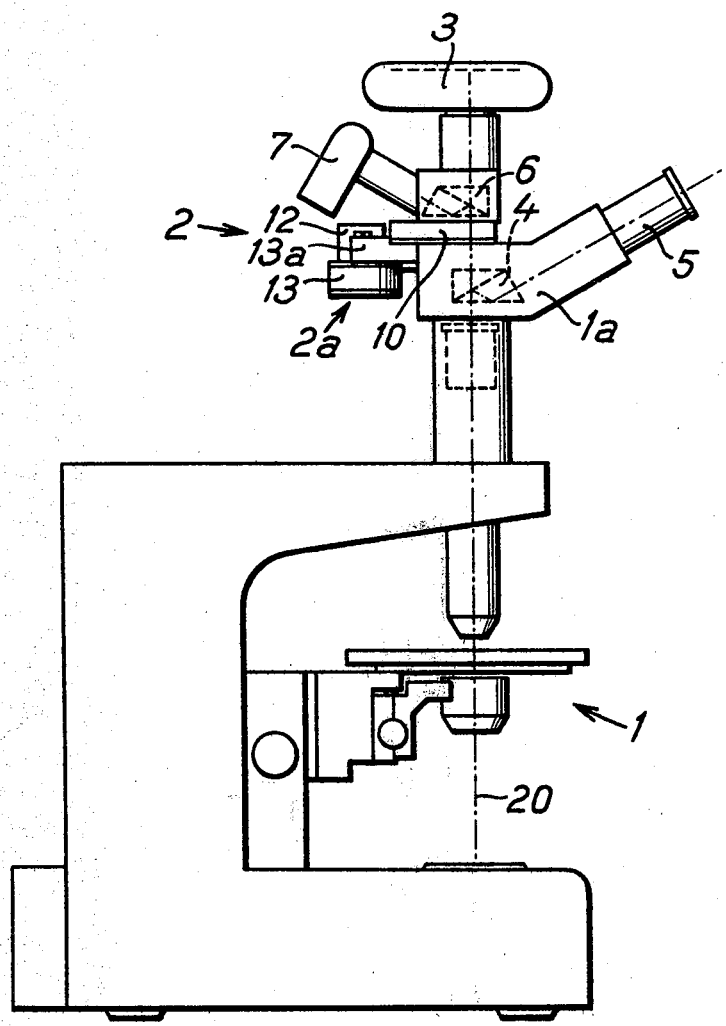
FIG. 1 shows a schematic view of the shutter attached to a microscope tube.

In FIG. 1, the shutter 2 is attached to a microscope 1 having a tube 1a and an optical axis 20. Above the shutter, an auxiliary camera 3 is mounted. Underneath the shutter 2, a prism 4, shown in dashed lines, is disposed, deflecting a portion of the light flux from the optical axis to an observation device 5. Above the shutter, a further beam-splitting prism 6 is arranged in the optical axis which transmits a partial beam of rays to a light meter 7.

Figure 3:
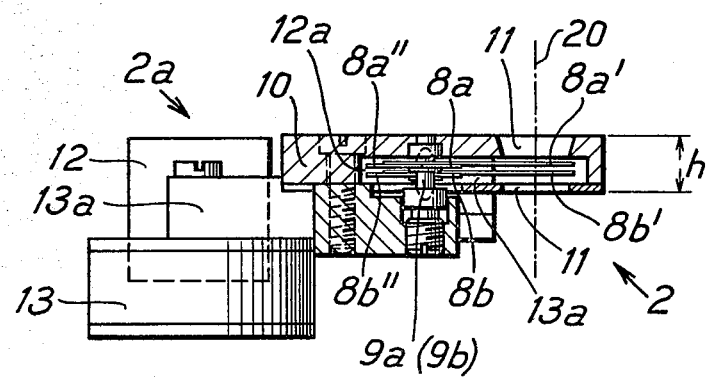
FIG. 3 is a lateral view of the shutter in the direction of arrow A in FIG. 2.

It can be seen particularly clearly from the illustration of FIG. 1 that such an arrangement is possible only because the shutter 2 has the minor structural thickness "$h$", as indicated in FIG. 3, in the zone of the light flux, and, besides, all other structural elements, such as, e.g. the magnet with its current connection, etc., are displaced to one side of the optical axis into the part $2a$. As a result of this design, there is a good possibility of attaching still further components to the tube on the other side of the optical axis, especially the observation device 5.

Figure 2:
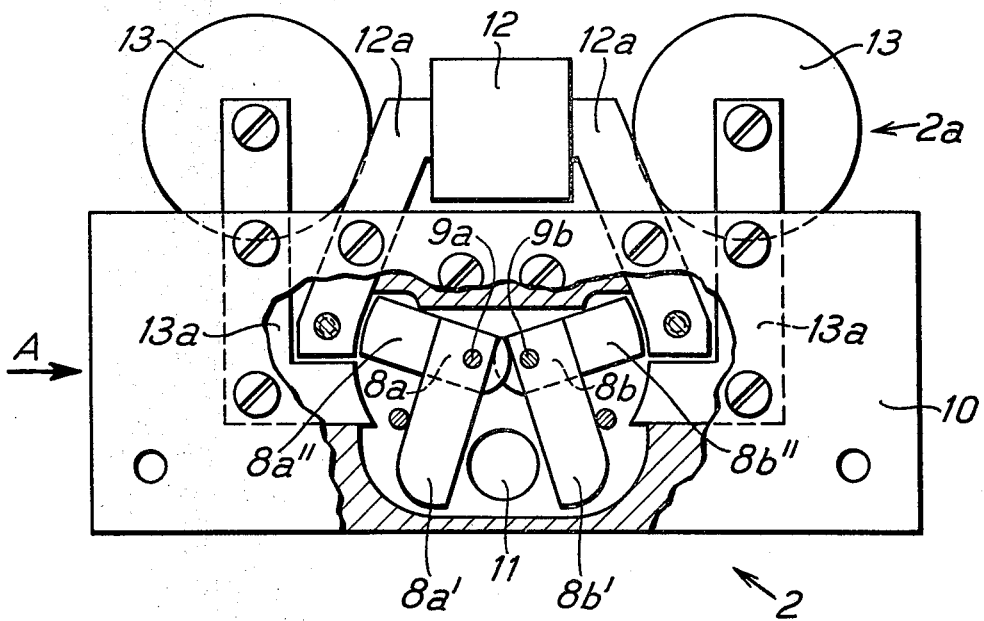
FIG. 2 shows a top view of the shutter illustrated as an individual element.

The shutter proper consists of two slides $8a$, $8b$ fashioned in the form of angles (FIG. 2). These slides are rotatably attached to a base plate 10 by means of pins $9a$, $9b$. The blade $8a'$ and $8b'$ are the light-blocking blades of metallic or non-metallic material which block or uncover the light passage through the aperture 11 located on the optical axis. The blades $8a''$ and $8b''$ of metallic or plastic material with metal therein cooperate with the magnet cores. In this regard, two separate magnetic circuits are provided, one for the open position of the slides and one for the closed position. In FIG. 2, the open position is shown. The two magnetic flux circuits are indicated by the two magnet cores $12a$, $13a$, terminating to the right and to the left beside the blades $8a''$ and $8b''$, and with which the magnets 12 and 13 cooperate.

The function of the shutter is simple and is known from similar shutters. For opening the shutter, the magnet 12 is actuated. Thereby, the blades $8a''$, $8b''$ of the slides $8a$, $8b$ are adjusted with respect to the poles of the magnet core $12a$ in such a manner that the slides $8a$, $8b$ rotate about the pins $9a$, $9b$, and the blades $8a'$, $8b'$ uncover the light passage aperture 11. For the purpose of closing, the magnet 13 is then actuated, and consequently the slides $8a$, $8b$ are rotated backwards again, so that the blades $8a''$, $8b''$ can adjust themselves to be in opposition to the poles of the magnet core $13a$.

We claim:

1. A compound lens system having an optical axis, a photographic image recorder along said optical axis, and means for optically viewing through said lens system located to one side of said optical axis, the improvement comprising an electromagnetically operated shutter having electromagnets for said recorder comprising:
   a light passage aperture along said optical axis;
   first shutter blade means having a first blade and a second blade extending from a first apex at an angle to one another;
   second shutter blade means having a third blade and a fourth blade extending from a second apex at an angle to one another;
   said first and second shutter blade means located between said means for viewing and said photographic image recorder;
   said first and second shutter blade means having means for rotatably mounting at said first and second apex, said means for rotatably mounting having second and third axes parallel to said optical axis;
   said second and third axes disposed to the opposite side of said optical axis from said means for optically viewing;
   said first and third blades cooperating to cover said aperture in the closed position; and
   said second and fourth blades actuated by said electromagnets having magnetic cores and said electromagnets and magnetic cores disposed on one side of said optical axis opposite said means for optically viewing.

2. The apparatus of claim 1 wherein said first and third blades comprise non-magnetic material and said second and fourth blades comprise magnetic material.

3. The apparatus of claim 1 wherein said first, second, third and fourth blades comprise non-magnetic material and said second and fourth blades are studded with pieces of magnetic material.

4. The apparatus of claim 1 further comprising one magnetic flux circuit for opening and another magnetic flux circuit for the closing of said first and second shutter blade means.

5. The apparatus of claim 1 further comprising two magnetic flux circuits for the opening and closing of said first and second shutter blade means arranged separately from each other.

* * * * *